United States Patent
Broder et al.

(10) Patent No.: US 8,032,532 B2
(45) Date of Patent: *Oct. 4, 2011

(54) EFFICIENT MULTIFACETED SEARCH IN INFORMATION RETRIEVAL SYSTEMS

(75) Inventors: Andrei Z. Broder, Bronx, NY (US); Nadav Eiron, San Jose, CA (US); Felipe Marcus Fontoura, San Jose, CA (US); Ronny Lempel, Haifa (IL); Ning Li, Raleigh, NC (US); John Ai McPherson, Jr., San Jose, CA (US); Andreas Neumann, Muelheim an der Ruhr (DE); Shila Ofek-Koifman, Haifa (IL); Runping Qi, Cupertino, CA (US); Eugene J. Shekita, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 634 days.

This patent is subject to a terminal disclaimer.

(21) Appl. No.: 12/124,272

(22) Filed: May 21, 2008

(65) Prior Publication Data
US 2008/0222117 A1 Sep. 11, 2008

Related U.S. Application Data

(63) Continuation of application No. 11/564,915, filed on Nov. 30, 2006, now Pat. No. 7,496,568.

(51) Int. Cl.
*G06F 7/00* (2006.01)
(52) U.S. Cl. ...................................... 707/742
(58) Field of Classification Search .................. 707/742, 707/999.003
See application file for complete search history.

(56) References Cited

U.S. PATENT DOCUMENTS

| | | | |
|---|---|---|---|
| 5,704,060 | A | 12/1997 | Del Monte |
| 5,787,421 | A | 7/1998 | Nomiyama |
| 6,212,494 | B1 | 4/2001 | Boguraev |
| 6,236,985 | B1 | 5/2001 | Aggarwal et al. |
| 6,243,713 | B1 * | 6/2001 | Nelson et al. ........................ 1/1 |

(Continued)

FOREIGN PATENT DOCUMENTS
CN 1716252A A1 1/2006
(Continued)

OTHER PUBLICATIONS

Notice of Allowance (Mail Date Sep. 22, 2008) for U.S. Appl. No. 11/564,915, filed Nov. 30, 2006; Confirmation No. 3338.

(Continued)

*Primary Examiner* — John R. Cottingham
*Assistant Examiner* — Mohammed R Uddin
(74) *Attorney, Agent, or Firm* — Schmeiser, Olsen & Watts

(57) ABSTRACT

A method and system for querying multifaceted information. An inverted index is constructed to include unique indexed tokens associated with posting lists of one or more documents. An indexed token is either a facet token included in a document as an annotation or a path prefix of the facet token. The annotation indicates a path within a tree structure representing a facet that includes the document. The tree structure includes nodes representing categories of documents. A query is received that includes constraints on documents. The constraints are associated with indexed tokens and corresponding posting lists. An execution of the query includes identifying the corresponding posting lists by utilizing the constraints and the inverted index and intersecting the posting lists to obtain a query result.

20 Claims, 10 Drawing Sheets

U.S. PATENT DOCUMENTS

| | | | |
|---|---|---|---|
| 6,381,354 B1 | 4/2002 | Mennie et al. | |
| 6,490,579 B1 | 12/2002 | Gao et al. | |
| 6,519,586 B2 | 2/2003 | Anick et al. | |
| 6,665,666 B1 | 12/2003 | Brown et al. | |
| 6,745,206 B2 | 6/2004 | Mandler et al. | |
| 6,748,387 B2 | 6/2004 | Garber et al. | |
| 6,925,608 B1 | 8/2005 | Neale et al. | |
| 6,963,871 B1 | 11/2005 | Hermansen et al. | |
| 7,472,347 B2 | 12/2008 | Cooper et al. | |
| 7,499,915 B2 * | 3/2009 | Chandrasekar et al. | 1/1 |
| 7,836,050 B2 * | 11/2010 | Jing et al. | 707/728 |
| 2002/0032672 A1 | 3/2002 | Keith, Jr. | |
| 2003/0018622 A1 | 1/2003 | Chau | |
| 2004/0167889 A1 * | 8/2004 | Chang et al. | 707/3 |
| 2004/0267700 A1 | 12/2004 | Dumais et al. | |
| 2005/0108200 A1 * | 5/2005 | Meik et al. | 707/3 |
| 2006/0112079 A1 | 5/2006 | Holt et al. | |
| 2006/0167930 A1 * | 7/2006 | Witwer et al. | 707/102 |
| 2006/0282411 A1 | 12/2006 | Fagin et al. | |
| 2006/0288039 A1 * | 12/2006 | Acevedo-Aviles et al. | 707/104.1 |
| 2007/0050753 A1 | 3/2007 | Holt et al. | |
| 2007/0055680 A1 | 3/2007 | Statchuk | |
| 2007/0106658 A1 * | 5/2007 | Ferrari et al. | 707/5 |
| 2007/0208738 A1 | 9/2007 | Morgan | |
| 2008/0010250 A1 * | 1/2008 | Fontoura et al. | 707/3 |

FOREIGN PATENT DOCUMENTS

| | | |
|---|---|---|
| JP | 2003091419 A | 3/2003 |

OTHER PUBLICATIONS

Search Tools.Com (from Internet Jul. 13, 2006); XML and Search; 6 pages.

* cited by examiner

450

| | |
|---|---|
| facet:A | d1, d2, d3 |
| facet:A.B | d1, d2 |
| facet:A.B.E | d1 |
| facet:A.C | d1, d3 |
| facet:A.C.F | d1, d3 |
| facet:X | d1, d2 |
| facet:X.Y | d1 |
| facet:X.Z | d2 |

| facet:A.B* | d2 |
| facet:A.B.E* | d1 |
| facet:A.C.F* | d1, d3 |
| facet:X.Y* | d1 |
| facet:X.Z* | d1 |

EFFICIENT MULTIFACETED SEARCH IN INFORMATION RETRIEVAL SYSTEMS

This application is a continuation application claiming priority to Ser. No. 11/564,915, filed Nov. 30, 2006, now U.S. Pat. No. 7,496,568 issued Feb. 24, 2009.

FIELD OF THE INVENTION

The present invention relates to a method and system for searching multifaceted information encoded by an inverted text index in an information retrieval system.

BACKGROUND OF THE INVENTION

Conventional information retrieval (IR) systems combine free text search with contextual navigation to enhance the user experience. For example, a website that sells products provides a keyword search interface to search a database of documents associated with the products being sold, and the interface is combined with a browsing menu that allows users to drill down into several levels of categories of the products. In response to a user issuing a keyword query to search the database, the IR system presents the user with a set of relevant documents as a result of that query, and also changes the navigation menu to display the most relevant facets for the given query. Improvements are needed relative to the speed at which these known IR systems present the keyword search results and update the contextual navigation menu. Further, the development efforts required to combine free text search with contextual navigation are significant. Thus, there exists a need to overcome at least one of the preceding deficiencies and limitations of the related art.

SUMMARY OF THE INVENTION

The present invention provides a computer-implemented method of querying multifaceted information in an information retrieval system, comprising:

constructing, by the information retrieval (IR) system, an inverted index having a plurality of unique indexed tokens associated with a plurality of posting lists in a one-to-one correspondence, each posting list including one or more documents of a plurality of documents, wherein an indexed token of the plurality of unique indexed tokens is one of a facet token included as an annotation in a document of the plurality of documents and a path prefix of the facet token, wherein the annotation indicates a path within a tree structure representing a facet that includes the document, the tree structure including a plurality of nodes representing a category and one or more sub-categories that categorize the document;

receiving, by the IR system, a query that includes a plurality of constraints on the plurality of documents, the plurality of constraints being associated with multiple indexed tokens of the plurality of unique indexed tokens and multiple posting lists corresponding to the multiple indexed tokens; and executing the query by the IR system, the executing including:

identifying the multiple posting lists via a utilization of the plurality of constraints and the inverted index, and intersecting the multiple posting lists to obtain a result of the query.

A system and a computer program product corresponding to the above-summarized method are also described and claimed herein.

Advantageously, the present invention provides a scalable technique that efficiently encodes facet information in an inverted index. Further, the present invention provides a runtime algorithm that efficiently evaluates queries that combine free text constraints and navigational constraints, thereby returning query results more quickly. Still further, the disclosed runtime algorithm is robust even though the indexed documents may be categorized inconsistently.

BRIEF DESCRIPTION OF THE DRAWINGS

FIG. 4B depicts an inverted index associated with the taxonomy of FIG. 4A, in accordance with embodiments of the present invention.

FIG. 4C depicts special facet tokens and posting lists for the taxonomy of FIG. 4A, in accordance with embodiments of the present invention.

DETAILED DESCRIPTION OF THE INVENTION

Overview

The present invention provides a scalable solution for adding multifaceted navigation capabilities to IR systems. The solution disclosed herein includes an inverted index used to encode multifaceted information and a runtime algorithm that efficiently evaluates queries that combine navigational constraints and free-text predicates (i.e., keywords). Further, the present invention provides a technique for efficiently counting the number of documents included in sub-categories of a category specified in a query constraint. Still further, a technique for computing an aggregate function relative to such sub-categories is also disclosed herein.

System for Querying Multifaceted Information

Figure 1:
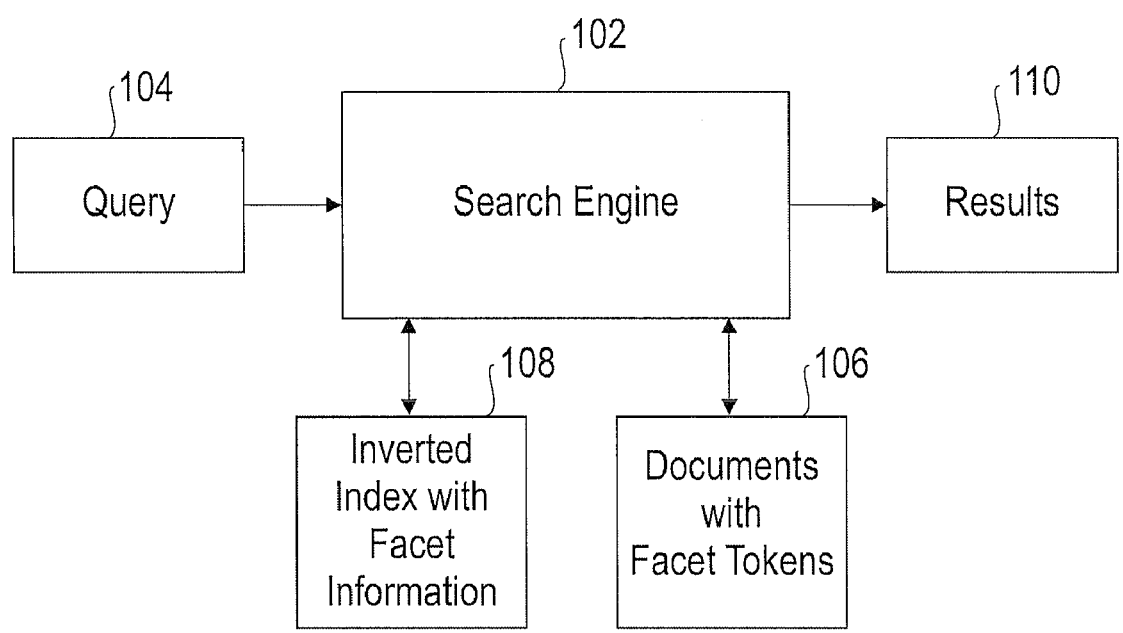
FIG. 1 is a block diagram of a system for querying multifaceted information encoded by an inverted text index in an information retrieval system, in accordance with embodiments of the present invention.

FIG. 1 is a block diagram of a system for querying multifaceted information encoded by an inverted text index in an information retrieval system, in accordance with embodiments of the present invention. IR system 100 (a.k.a. multifaceted search system) includes a search engine 102 which receives a search query 104. Search engine 102 receives incoming documents 106 which include facet tokens as annotations within the text of each document. Further, search engine 102 uses the facet tokens to build an inverted index 108 that associates facet information with posting lists. Each posting list includes one or more documents (a.k.a. qualifying documents) of the set of incoming documents 106. Still further, search engine 102 executes query 104 by intersecting posting lists in inverted index 108 to determine results 110 of the query.

Figure 2:
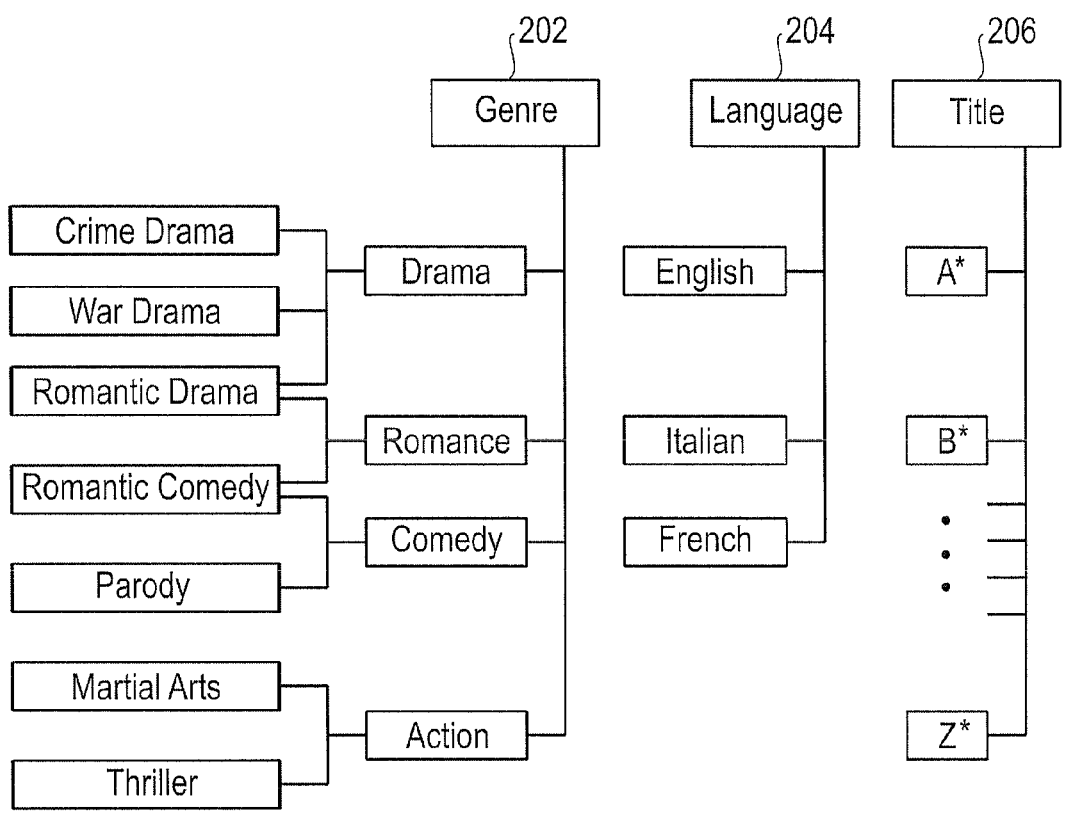
FIG. 2 is an example of multifaceted information that can be searched by the system of FIG. 1, in accordance with embodiments of the present invention.

FIG. 2 is an example of multifaceted information that can be searched by the system of FIG. 1, in accordance with embodiments of the present invention. As used herein, a facet is defined as a hierarchy or taxonomy with a directed acyclic graph (DAG) or tree structure that categorizes items by a category and one or more sub-categories. Users of the multifaceted search system navigate a search space by drilling down through the categories and sub-categories of facets. Multifaceted information 200 includes three facets that categorize movies by genre 202, language 204 and title 206. Sub-categories under the genre category include drama, romance, comedy and action movies. An additional level of sub-categories exists for each of these genre sub-categories. For example, sub-categories of drama include crime drama, war drama and romantic drama movies.

Using the multifaceted movie information organized in the facets of FIG. 2, an exemplary database search is performed for movie dramas in any language. A graphical drill-down for this search is illustrated below:

```
            Genre
              →Drama
                 Crime drama (200)
                 War drama (200)
                 Romantic drama (100)
              →Language
                 English (400)
                 French (100)
```

Results of the search are displayed as a list including titles of movies that are English or French-language dramas (e.g., The Godfather, starring Marlon Brando and Al Pacino; The Great Escape, starring Steve McQueen; Scarface, starring Al Pacino; The French Connection, starring Gene Hackman; Breathless, starring Jean-Paul Belmondo, etc.). The numbers in parentheses indicate the number (i.e., counts) of qualifying movies within each drama sub-category and within each language sub-category. For example, (200) after crime drama indicates that there are 200 crime dramas in the database. These numbers in parentheses guide further drill-down by the user.

Continuing the example, a second drill-down is shown that now limits the search to English-language movies in the drama genre:

```
            Genre
              →Drama
                 Crime drama (100)
                 War drama (50)
                 Romantic drama (50)
              Language
                 →English (200)
```

In this second drill-down, the counts shown for the dramas have decreased from the first drill-down because only English-language dramas are considered. Further, the list of search results is similarly shortened by excluding French-language dramas (e.g., The Godfather, starring Marlon Brando and Al Pacino; The Great Escape, starring Steve McQueen; Scarface, starring Al Pacino; The French Connection, starring Gene Hackman, etc.).

Still continuing this example, "Al Pacino" is entered as a keyword search term and the resulting drill-down is shown below:

```
            Genre
              →Drama
                 Crime drama (10)
              Language
                 →English (10)
```

In this case, the search engine determined that war dramas and romantic dramas each had a count of zero, and therefore stopped displaying those two sub-categories as drill-down choices. In the search results list, only English-language dramas starring Al Pacino are displayed (e.g., The Godfather, starring Marlon Brando and Al Pacino and Scarface, starring Al Pacino).

Indexing

Figure 3:
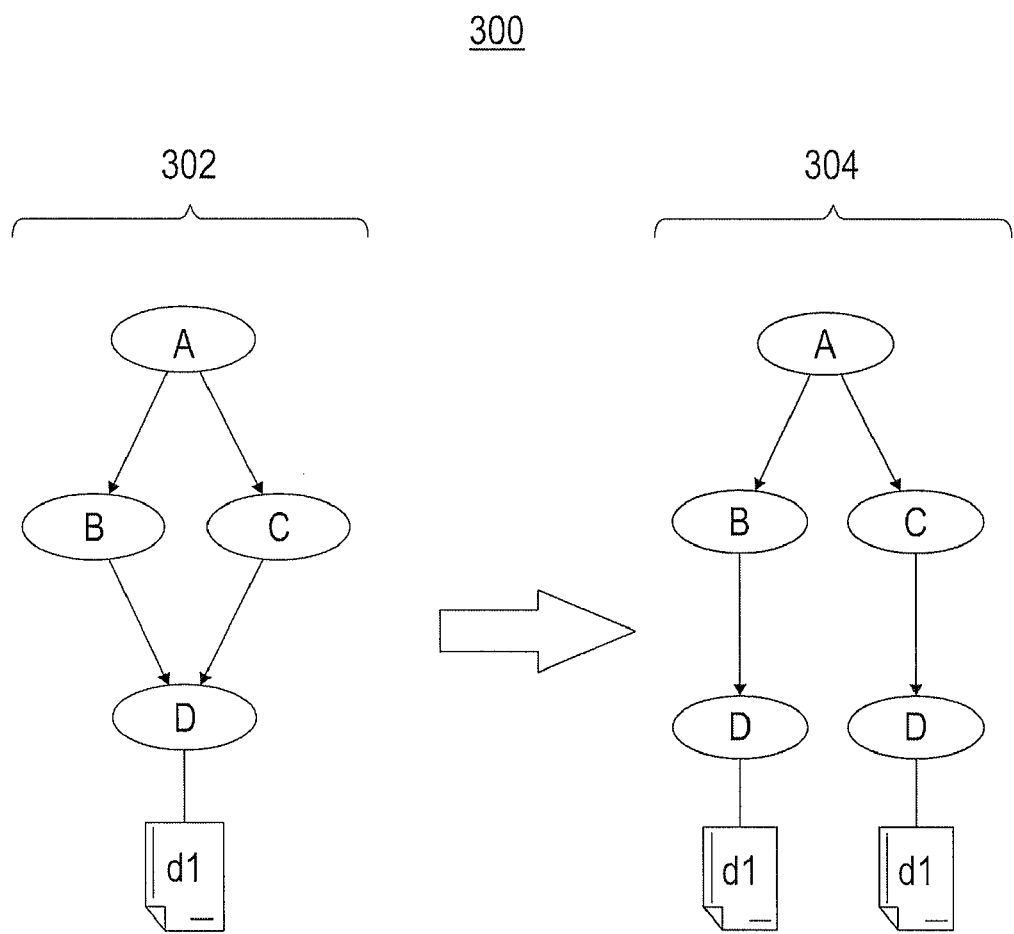
FIG. 3 depicts a mapping of incoming documents to a tree structure to be utilized by the system of FIG. 1, in accordance with embodiments of the present invention.

FIG. 3 depicts a mapping 300 of incoming documents to a tree structure to be utilized by the system of FIG. 1, in accordance with embodiments of the present invention. The hierarchy of category and sub-categories for incoming documents is a tree-structured or a DAG-structured facet that is transformed into a tree structure prior to indexing. For example, DAG 302 includes document d1 associated with node D. Prior to indexing, DAG 302 is transformed into a tree-structured facet 304 in which document d1 is associated with two distinct node Ds. After the transformation to facet 304, the inverted index considers path A.B.D as ending in a different node than path A.C.D.

Each incoming document includes one or more facet tokens. As used herein, a facet token is defined as a document annotation that indicates a path in a facet's tree-structured taxonomy. In one embodiment, facet tokens are inserted into documents as meta-data in a general-purpose markup language (e.g., Extensible Markup Language (XML)). Hereinafter, specific facet tokens are represented by the term "facet:" followed by a path indicator (e.g., "facet:A.B.D"). It will be apparent to those skilled in the art that other representations can be used to indicate a facet token. The path indicated by a facet token usually ends in a leaf node of the facet's tree structure, but may also end in an internal node of the tree structure.

Figure 4A:
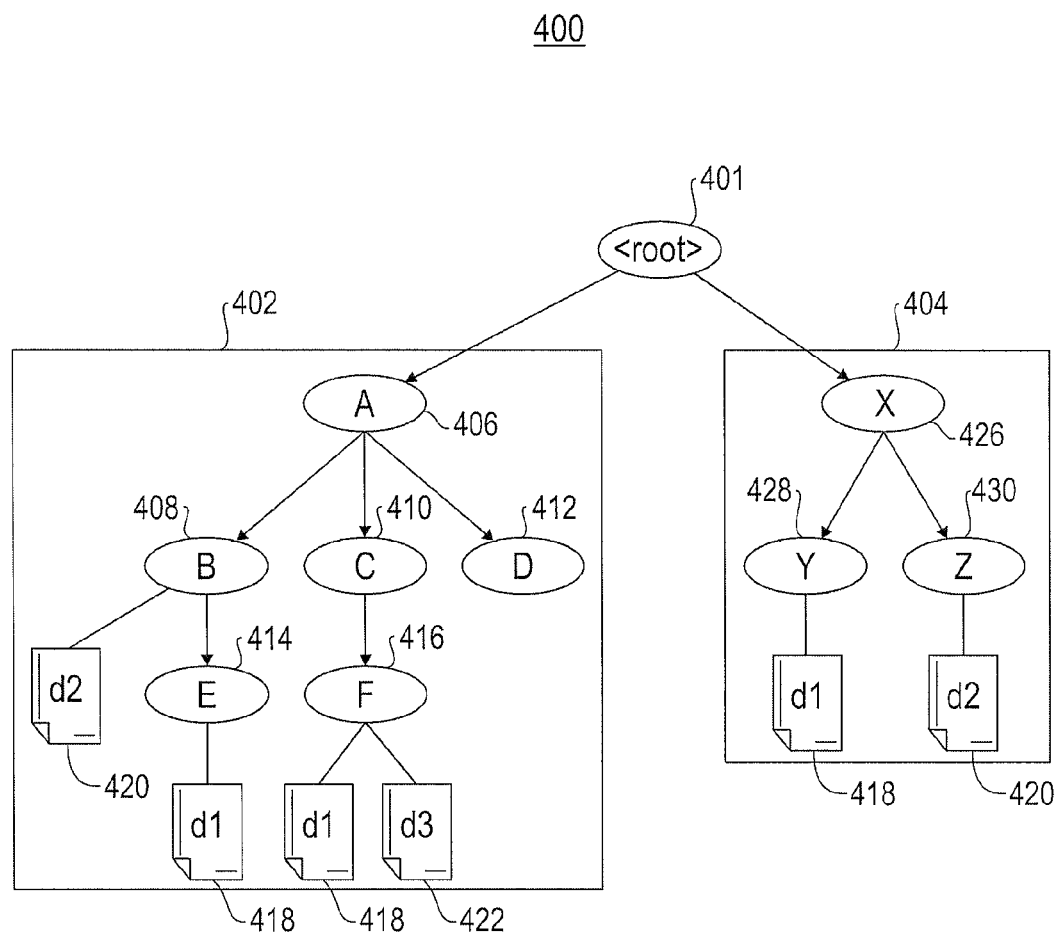
FIG. 4A is an example of a taxonomy of multifaceted documents to be searched by the system of FIG. 1, in accordance with embodiments of the present invention.

FIG. 4A is an example of a taxonomy of multifaceted documents to be searched by the system of FIG. 1, in accordance with embodiments of the present invention. Taxonomy 400 includes a virtual root node 401 and also includes two facets 402 and 404. Facet 402 includes category 406 (i.e., node A), sub-categories 408, 410, 412 (i.e., nodes B, C, and D, respectively, which are sub-categories of node A), sub-category 414 (i.e., node E, which is a sub-category of node B), and sub-category 416 (i.e., node F, which is a sub-category of node C). Facet 402 also includes documents 418, 420 and 422 (i.e., documents d1, d2 and d3, respectively). Document d1 is included in sub-categories 414 and 416, document d2 is included in sub-category 408 and document d3 is included in sub-category 416.

Facet 404 includes category 426 (i.e., node X) and node X's sub-categories 428 and 430 (i.e., nodes Y and Z, respectively). Facet 404 also includes document 418 in sub-category 428 and document 420 in sub-category 430.

It should be noted that a document can be included in multiple facets and be included in multiple paths within a facet. For example, document d1 is included in paths A.B.E and A.C.F of facet 402 and path X.Y of facet 404. To indicate its inclusion in paths A.B.E, A.C.F and X.Y, document d1 includes the following facet tokens: facet:A.B.E, facet:A.C.E and facet:X.Y.

An inverted index is constructed by multifaceted search system 100 (see FIG. 1) and is used by search queries to find documents that match one or more indexed tokens included in the inverted index. An indexed token is a keyword in a document or an arbitrary string that encodes meta-data. The inverted index associates each indexed token with a posting list, which is a list of one or more identifiers of qualifying documents (e.g., one or more documents that include the indexed token as a facet token). For example, an inverted index associates indexed token x with a first posting list that includes documents d1, d2 and d5 and indexed token y with a second posting list that includes documents d5 and d9. To execute a search query on indexed tokens "x y", the posting lists associated with x and y are intersected to produce d5 as the query's result. This result indicates that document d5 includes both indexed token "x" and indexed token "y".

In one embodiment, each item in a posting list in an inverted index includes an optional payload in which additional information about a document can be stored. Hereinafter, square bracket (i.e., [ ]) indicate a payload. For example, 0.1.0 is the payload in d3[0.1.0].

Returning to the movie database search example presented above relative to FIG. 2, the search for titles of movies that are dramas in any language can be provided by a query that includes an intersection of facet tokens. As one example, this query can have the following syntax:

facet:genre.drama AND facet:language

Similarly, the aforementioned search for titles of movies that are English-language crime dramas that star Al Pacino can be provided by the following query:

facet:genre.drama.crime AND facet:language.english AND "al pacino"

Each of the indexed tokens facet:genre.drama.crime and facet:language.english are associated with a posting list in the inverted index. The inverted index also includes a posting list for the keyword "al pacino". To execute this query, the posting lists associated with facet:genre.drama.crime, facet:language.english and "al pacino" are intersected to determine a query result.

In one embodiment, the query syntax also includes a function (e.g., GetCounts) that returns sub-category path names and their counts. The returned sub-category path names are the names of each sub-category under a category or sub-category specified by a facet restriction in the query. For example, the following query can be executed to return the sub-category names and counts under the genre.drama sub-category (see FIG. 2) and the sub-category names and counts under the language category (see FIG. 2):

facet:genre.drama AND facet:language, GetCounts(*)

Using the counts shown in the graphical drill down presented above relative to FIG. 2, this sample query returns genre.drama.{crime(200), war(200), romantic(100)} and language.{english(400), french(100)}. In the exemplary syntax shown above, GetCounts(*) indicates that the counts are based on the query's facet restrictions (i.e., facet:genre.drama and facet:language).

It should be noted that the count function included in the query can utilize facet restrictions that are different from the query's facet restrictions. For example, using the taxonomy of FIG. 5, the query facet:A AND facet:X, GetCounts(facet: A.B) returns the sub category name and counts of candidate documents relative to facet A.B rather than relative to A and X. The determination of counts is described in more detail below relative to FIGS. 5 & 6.

FIG. 4B depicts an inverted index 450 associated with the taxonomy of FIG. 4A. Inverted index 450 is constructed by multifaceted search system 100 (see FIG. 1) and includes indexed tokens 452 and posting lists 454 in a one-to-one correspondence. Each indexed token is either a facet token included in a document that is included in the associated posting list or derived from a unique prefix of the path indicated by the facet token. As an example, document d1 in FIG. 4A is in path A.B.E and includes facet token "facet:A.B.E". In the inverted index for this example, d1 is in the posting lists associated with indexed token "facet:A.B.E" (i.e., the indexed token which is the facet token included in d1), as well as in the posting lists associated with indexed tokens "facet: A" and "facet:A.B" (i.e., derived from the unique prefixes of the path A.B.E). Note that even though d1 is also included in path A.C.F, which also has a path prefix of A, the indexed token of "facet:A" appears in the inverted index only once to preserve the uniqueness of the entries in the indexed token list.

When executing a query, search engine 102 (see FIG. 1) utilizes the inverted index to find the one or more qualifying documents that constitute the query result. As an example relative to FIG. 4B, to find qualifying documents for a query on "facet:A.B AND facet:X.Y", the posting lists [d1,d2] and [d1] are intersected to provide the query result of document d1.

Incoming documents may include dirty data (e.g., inconsistencies in the categorization of documents). For instance, document d1 in FIG. 4A is categorized under paths A.B.E and A.C.F. These paths could represent two categorizations that are mutually exclusive. The methods described herein are robust to such inconsistencies.

FIG. 4C depicts special facet tokens and posting lists for the taxonomy of FIG. 4A, in accordance with embodiments of the present invention. In one embodiment, the inverted index constructed by the search engine includes a final category portion 470, which associates special facet tokens (a.k.a. special exact tokens) 472 with posting lists in a one-to-one correspondence. For each document, the final category portion of the inverted index includes special facet token(s) that indicate the final category or sub-category of any path to which the document belongs. This final category/sub-category indexing allows for querying of documents that reside "exactly" in a category or sub-category (i.e., belong to a category or sub-category, but not to any of the category or sub-category's children).

The special exact tokens 472 indicate categories and/or sub-categories of the taxonomy of FIG. 4A. In the example of FIG. 4C, the special exact token "facet:A.B*" is associated with the posting list that includes document d2, thereby indicating that d2 resides exactly in the node B sub-category (see facet 402 in FIG. 4A) and does not reside in the sub-category represented by node B's child node (i.e., does not reside in the node E sub-category).

Determining Counts of Qualifying Documents

Figure 5:
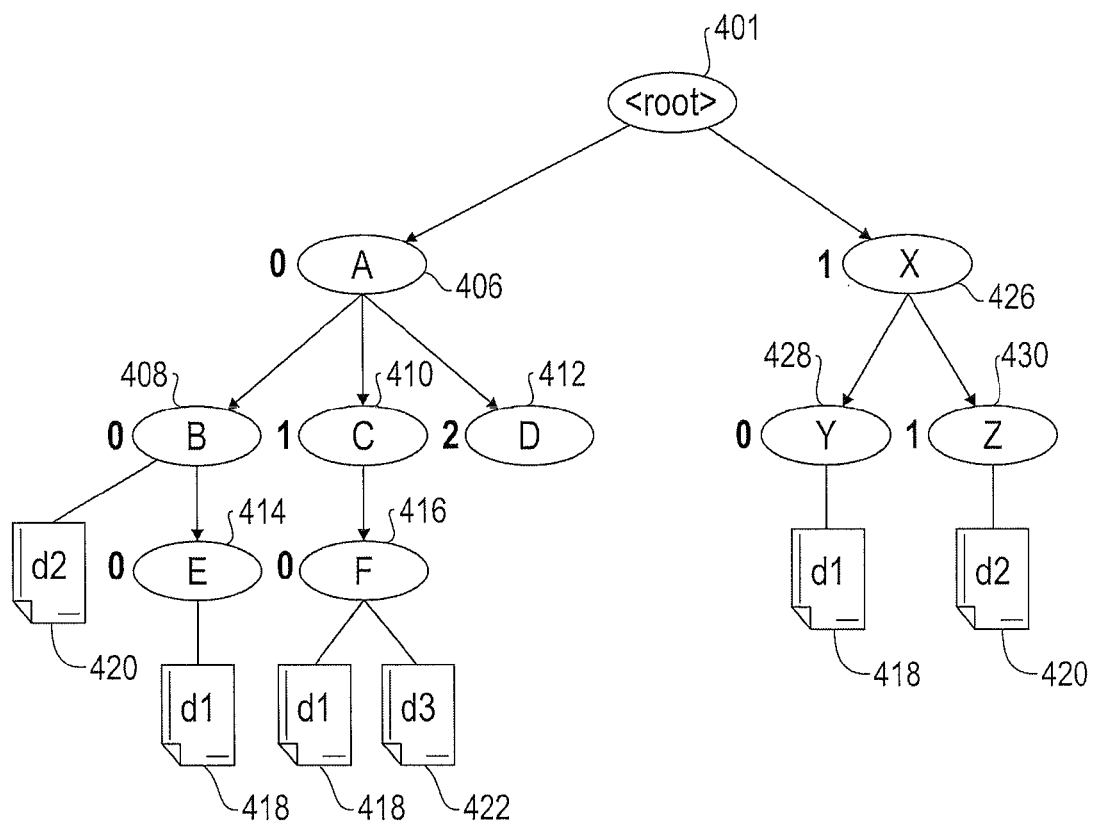
FIG. 5 depicts a taxonomy and labeling scheme that encodes full paths of each document in the taxonomy of FIG. 4A, in accordance with embodiments of the present invention.

FIG. 5 depicts a taxonomy and labeling scheme that encodes all of the full paths associated with each document in the taxonomy of FIG. 4A, in accordance with embodiments of the present invention. Taxonomy 500 includes a concise labeling scheme (e.g., Dewey labeling scheme) imposed upon taxonomy 400 of FIG. 4A. Refer to the discussion above relative to FIG. 4A for descriptions of nodes and documents 401-430 shown in FIG. 5. Relative to each parent node of taxonomy 500, a unique identifier (e.g., from a series of integers starting with 0) is assigned to each sibling node. In FIG. 5, a Dewey labeling scheme is used to assign 0 and 1 to sibling nodes A and X, respectively. Further, sibling nodes B, C and D in FIG. 5 are assigned 0, 1 and 2, respectively and sibling nodes Y and Z are assigned 0 and 1, respectively. Still further, the labeling scheme assigns a 0 to child nodes in FIG. 5 that have no siblings (e.g., nodes E and F). A fullpath token (e.g., the string "fullpath") is added to the inverted index and is associated with a posting list that includes identifiers representing all documents that can be searched by search engine 102 (see FIG. 1). Each identifier representing a document in the fullpath token posting list includes a payload value that uses indicators from the labeling scheme to indicate all of the full paths of that document. For example, the fullpath token and associated posting list for taxonomy 500 is:

fullpath d1[0.0.0, 0.1.0, 1.0], d2[0.0, 1.1], d3[0.1.0]

The fullpath token and posting list presented above illustrates that document d1 is included in full paths A.B.E, A.C.F, and X.Y, which correspond to the payload values of 0.0.0, 0.1.0, and 1.0, respectively; document d2 is included in full paths A.B and X.Z, which correspond to payload values 0.0 and 1.1, respectively; and document d3 is included in full path A.C.F, which corresponds to the payload value 0.1.0. It will be apparent to those skilled in the art that other encodings based on non-Dewey labeling schemes can also be used.

Figure 6:
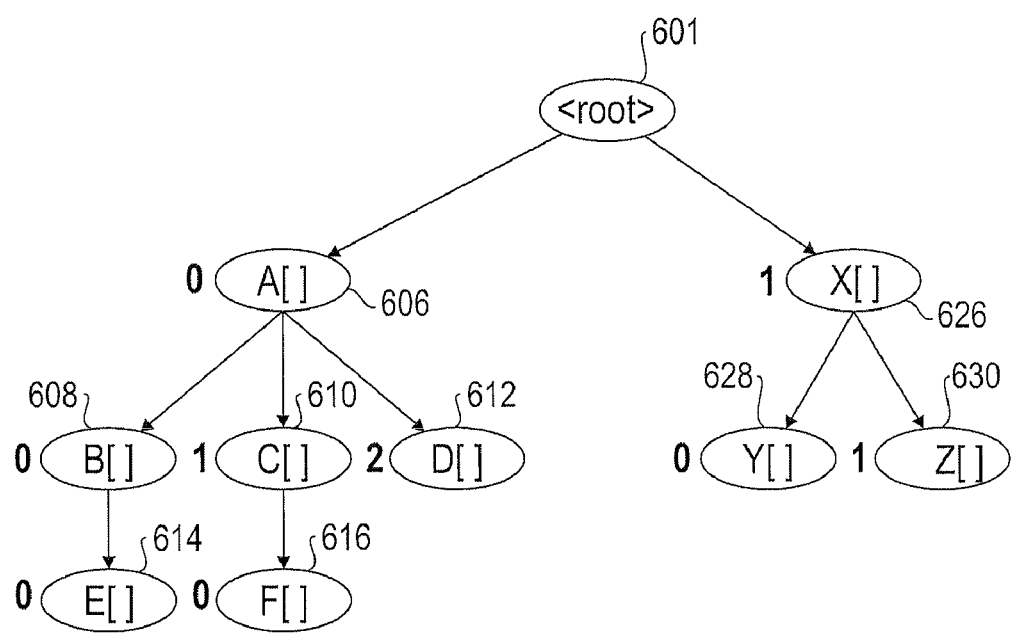
FIG. 6 is a hierarchy of counters corresponding to the taxonomy and labeling scheme of FIG. 5, in accordance with embodiments of the present invention.

FIG. 6 is a hierarchy of counters corresponding to the taxonomy and labeling scheme of FIG. 5, in accordance with embodiments of the present invention. A hierarchy 600 of counters is constructed by multifaceted search system 100 (see FIG. 1) to include a root node 601 corresponding to root node 401 of FIG. 5, and counters at nodes 606, 608, 610, 612, 614, 616, 626, 628 and 630 that correspond to the category or sub-category nodes 406, 408, 410, 412, 414, 416, 426, 428 and 430, respectively (see FIG. 5). Each of the counters in FIG. 6 is indexed by a value provided by the labeling scheme (see FIG. 5), where the value is the encoding of the full path of the counter's corresponding node in FIG. 5. For example, the counter F[ ] of node 616 is indexed by the Dewey encoding of 0.1.0 and is associated with the full path A.C.F of taxonomy 500 in FIG. 5.

The counters in hierarchy 600 are used by multifaceted search system 100 (see FIG. 1) to keep track of counts of qualifying documents associated with each sub-category of a category (or sub-category) used as a constraint in a search query. For example, a qualifying document under full path A.C.F in FIG. 6 is associated with the Dewey encoding of 0.1.0. Each prefix of the encoding 0.1.0 is determined and a counter associated with each prefix is incremented. In this example, the first prefix of 0.1.0 that is determined is the leftmost 0 in the encoding, which corresponds to the partial path A in taxonomy 600. Counter 606 (i.e., the counter corresponding to partial path A) is then incremented. The second prefix determined from 0.1.0 is 0.1, which corresponds to the partial path A.C, and counter 610 is incremented. Finally, the full prefix 0.1.0 is determined and counter 616, which corresponds to path full A.C.F, is incremented.

To support navigational operations, other counts are provided by embodiments of the present invention. In one embodiment, a query API provides a specification of whether the count function (e.g., GetCounts) of the query counts locally (i.e., only the children) or globally (i.e., the entire subtree). This specification of a local or a global mode facilitates the finding of nodes in the entire tree that have the higher counts for a given query. After the execution of a query, the navigational position of the user can be placed at the nodes that are most relevant (i.e., have higher counts) for that query. For example, using the taxonomy of FIG. 4A and facet:A as input into the GetCounts function, the function returns counts for A.B, A.C, A.D, A.B.E and A.C.F if GetCounts is in global mode and counts for only A.B, A.C and A.D if GetCounts is in local mode.

Query Execution Algorithm

Figure 7:
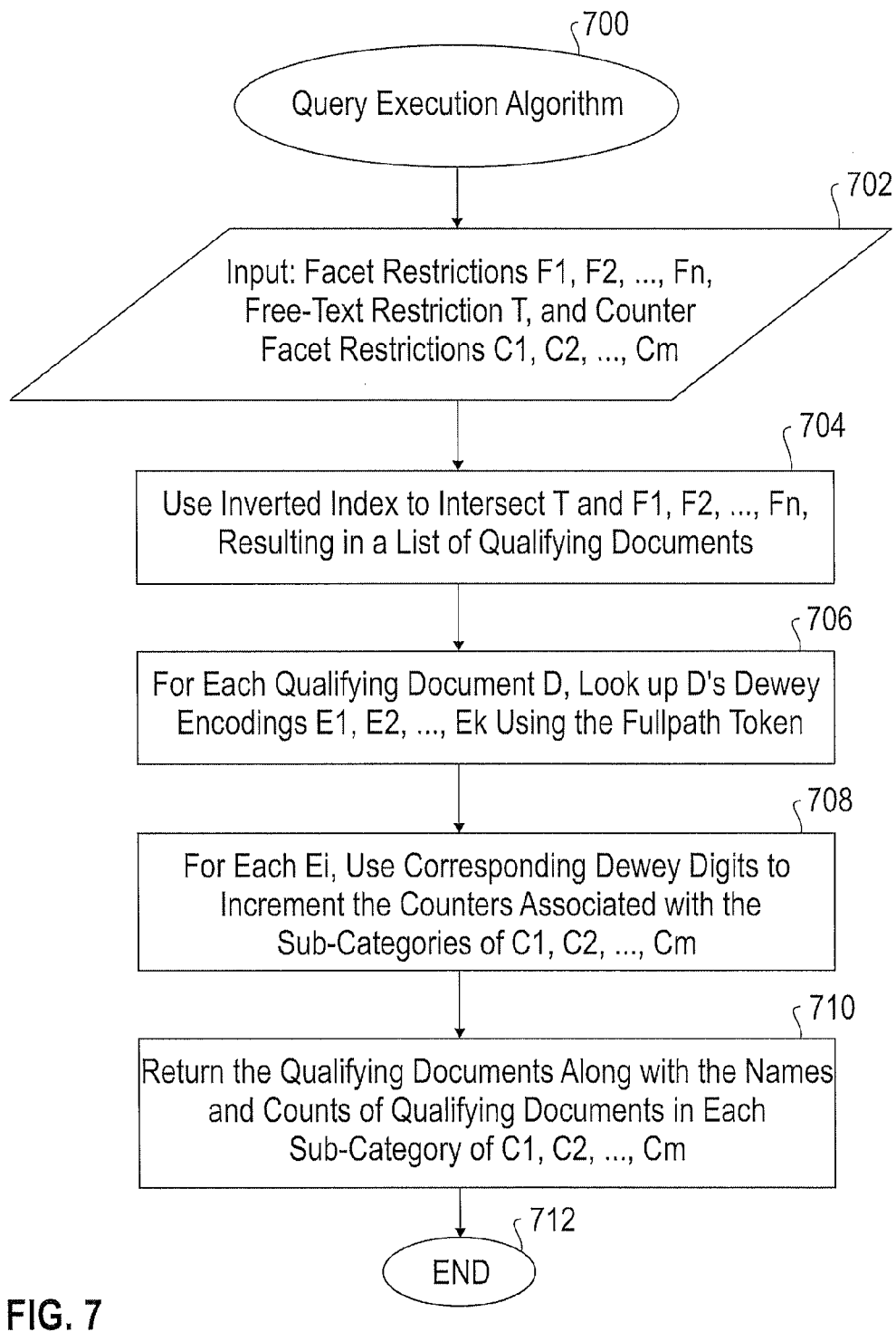
FIG. 7 is a process for executing a search query in the system of FIG. 1, in accordance with embodiments of the present invention.

FIG. 7 depicts a runtime algorithm for executing a search query in the system of FIG. 1, in accordance with embodiments of the present invention. Although this query execution algorithm utilizes Dewey encodings, it will be apparent to those skilled in the art that other encodings based on non-Dewey labeling schemes can also be used. Prior to the beginning of the query execution algorithm of FIG. 7, incoming documents are received by multifaceted search system 100 (see FIG. 1) and an inverted index is constructed as described above. The query execution algorithm starts at step 700 with a search query being received. The search query includes input 702 that includes one or more facet restrictions (a.k.a. constraints) F1, F2, . . . , Fn. Input 702 optionally includes a free-text (a.k.a. keyword) restriction T and/or one or more counter facet restrictions C1, C2, . . . , Cm.

In step 704, the inverted index is utilized to identify the posting lists associated with T and F1, F2, . . . , Fn. These identified posting lists are intersected to determine a list of one or more qualifying documents. In step 706, the fullpath token is used to look up Dewey encodings E1, E2, . . . , Ek for each qualifying document determined in step 704. For each encoding Ei, the Dewey digits in Ei are used in step 708 to increment counters associated with sub-categories of the categories and/or sub-categories indicated by C1, C2, . . . , Cm. In step 710, the qualifying documents are returned (e.g., displayed) along with the counts of qualifying documents in each sub-category of C1, C2, . . . , Cm and the names of those sub-categories of C1, C2, . . . , Cm. the query execution algorithm ends at step 712.

QUERY EXECUTION EXAMPLE

As an example of applying the query execution algorithm of FIG. 7, consider taxonomy 500 (see FIG. 5) and the following query as input 702:

facet:A.B AND facet:X, GetCounts(*)

In this example, the qualifying documents found by intersecting the facet tokens in step 704 are documents d1 and d2 (i.e., documents 418 and 420 of FIG. 5). Step 706 determines that the Dewey encodings for d1 and d2 that match the facet restrictions in the query are d1[0.0.0, 1.0] and d2[0.0, 1.1]. For d1, step 708 increments the counters associated with 0.0, 0.0.0, 1 and 1.0 (i.e., paths A.B, A.B.E, X, and X.Y, respectively). For d2, step 708 increments the counters associated with 0.0, 1 and 1.1 (i.e., paths A.B, X, and X.Z, respectively). Finally, step 710 returns qualifying documents d1 and d2, as well as the sub-categories of A.B and X and counts of the qualifying documents in those sub-categories. For instance, the sub-categories and counts are represented as A.B{E(1)} X{Y(1), Z(1)}, where the sub-categories are listed within the braces (i.e. "{ }") and each count is within parentheses immediately following its associated sub-category.

Aggregation Function

In one embodiment, the aforementioned count function (e.g., GetCounts) included in the query syntax is supplemented with a more general function that provides aggregations over faceted data, where the aggregations are more sophisticated than simple counts of records or documents belonging to sub-categories of a certain category. Such aggregations are required in certain faceted search applications such as business intelligence (BI) applications and facilitate navigation to sub-categories of a facet.

In certain data collections (e.g., enterprise data), each document has one or more numeric fields associated therewith and which are indexed in search engine 102 (see FIG. 1). Faceted query 104 (see FIG. 1) includes a free-text portion and category constraints, as well as a set of categories that require sub-counts (i.e., the counts of all sub-categories of each category in the set, as described above relative to FIGS. 5 and 6). With each category that requires sub-counts, the present invention associates one or more arithmetic expressions over the numeric fields that are associated with the indexed documents. The search engine 102 (see FIG. 1) computes and returns, per sub-category, the arithmetic expression(s), in addition to counting the number of matching documents. Each of the arithmetic expressions may contain an aggregation function (e.g., sum, product, average, maxima or minima) and/or basic formulae (e.g., any combination of numeric fields and/or numeric constants, the operators for addition, subtraction, multiplication, and/or division, and parentheses). One example of an arithmetic expression is AVG{contract_value−2*estimated_cost}. Interfaces are provided so that the arithmetic expressions can be added to query 104 (see FIG. 1), and returned along with the counts in the search results.

For example, assume that each document in "project collection" has two numeric values associated therewith: contract_value and estimated_cost. Further, assume that there is a geography dimension, and that the category "US" (i.e., indicating the United States) is selected with the sub-categories being the 50 states of the United States. As described above, search engine 102 (see FIG. 1) counts the number of projects per state. In this embodiment, the search engine also utilizes the aggregation function to sum, for each state, the value [contract_value−estimated_cost] (i.e., expected profit) over all the projects in that state. This aggregation indicates, per sub-category (i.e., per state), the expected profit of the projects, rather than providing only the count of how many projects are within that state.

Computing System

Figure 8:
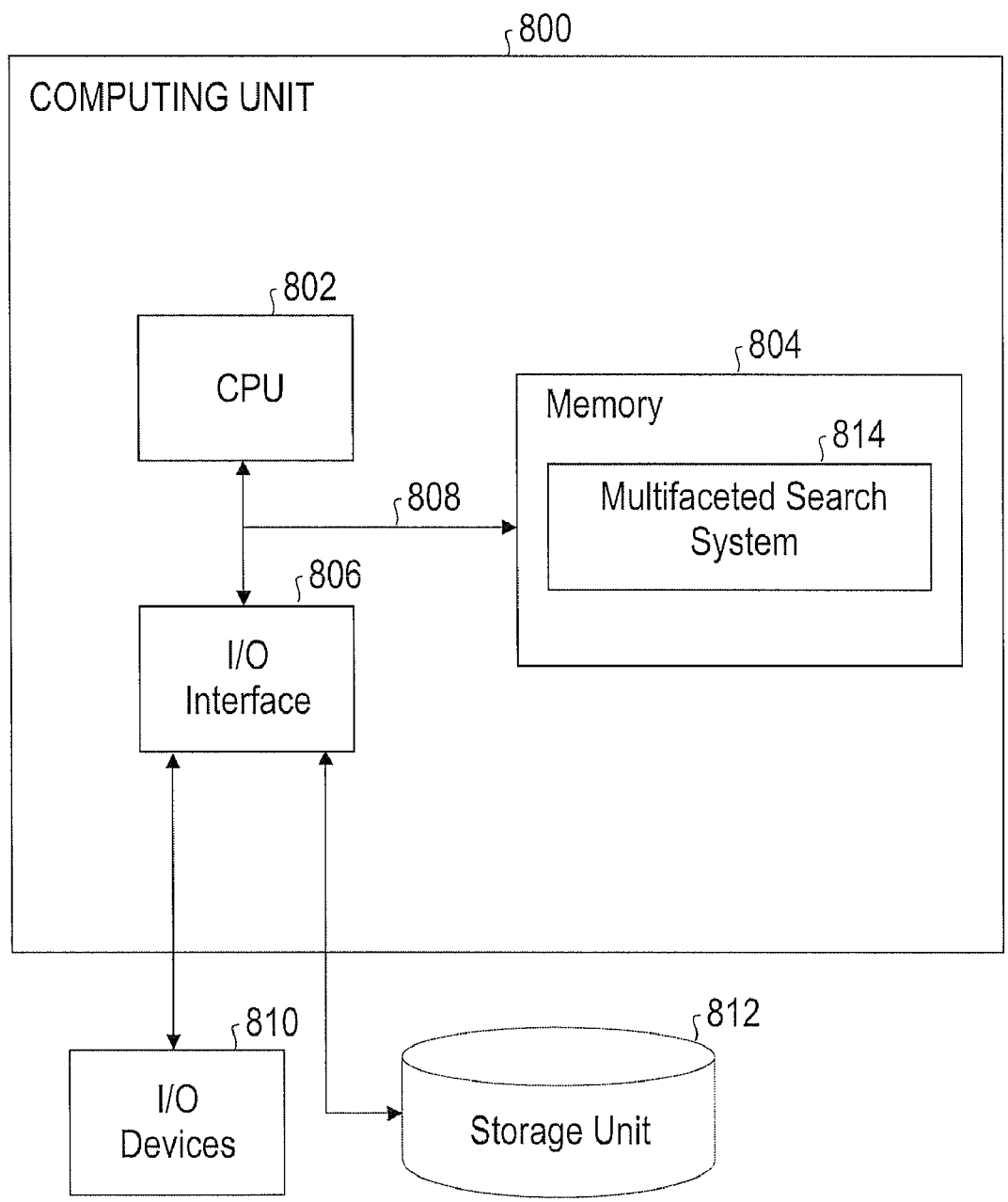
FIG. 8 is a computing system for implementing the algorithm of FIG. 7, in accordance with embodiments of the present invention.

FIG. 8 is a computing system for implementing the algorithm of FIG. 7, in accordance with embodiments of the present invention. Computing unit 800 is suitable for storing and/or executing program code of a multifaceted search system 814, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Local memory elements of memory 804 are employed during actual execution of the program code of multifaceted search system 814. Cache memory elements of memory 804 provide temporary storage of at least some program code in order to reduce the number of times code must be retrieved from bulk storage during execution. Further, memory 804 may include other systems not shown in FIG. 8, such as an operating system (e.g., Linux) that runs on CPU 802 and provides control of various components within and/or connected to computing unit 800.

Memory 804 may comprise any known type of data storage and/or transmission media, including bulk storage, magnetic media, optical media, random access memory (RAM), read-only memory (ROM), a data cache, a data object, etc. Storage unit 812 is, for example, a magnetic disk drive or an optical disk drive that stores data. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can tale the form of a computer program product accessible from a computer-usable or computer-readable medium providing program code of multifaceted search system 814 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of querying multifaceted information in an information retrieval system, comprising:

constructing, by said information retrieval (IR) system, an inverted index having a plurality of unique indexed tokens associated with a plurality of posting lists in a one-to-one correspondence, each posting list including one or more documents of a plurality of documents, wherein an indexed token of said plurality of unique indexed tokens is one of a facet token included as an annotation in a document of said plurality of documents and a path prefix of said facet token, wherein said annotation indicates a path within a tree structure representing a facet that includes said document, said tree structure including a plurality of nodes representing a category and one or more sub-categories that categorize said document;

receiving, by said IR system, a query that includes a plurality of constraints on said plurality of documents, said plurality of constraints being associated with multiple indexed tokens of said plurality of unique indexed tokens and multiple posting lists corresponding to said multiple indexed tokens; and executing said query by said IR system, said executing including:
identifying said multiple posting lists via a utilization of said plurality of constraints and said inverted index, and
intersecting said multiple posting lists to obtain a result of said query.

2. The method of claim 1, wherein said plurality of constraints includes one or more facet constraints and one or more free-text constraints, and wherein said identifying said multiple posting lists comprises:
identifying, via said inverted index, a first set of one or more indexed tokens associated with said one or more facet constraints in a one-to-one correspondence and a second set of one or more indexed tokens associated with said one or more free-text constraints in a one-to-one correspondence, said first set and said second set of one or more indexed tokens included in said plurality of unique indexed tokens; and
identifying, via said inverted index, a first group of one or more posting lists and a second group of one or more posting lists, said one or more posting lists of said first group associated with said one or more indexed tokens of said first set in a one-to-one correspondence and said one or more posting lists of said second group associated with said one or more indexed tokens of said second set in a one-to-one correspondence.

3. The method of claim 1, wherein said constructing said inverted index comprises:
generating a full path token and a full path token posting list associated therewith by said inverted index, said full path token posting list including a plurality of identifiers representing said plurality of documents, wherein an identifier of said plurality of identifiers represents said document and includes a payload value, said payload value identifying a full path of said document in said tree structure, and said payload value including a set of full path indicators provided by a scheme that uniquely labels each sibling node of said tree structure.

4. The method of claim 3, further comprising:
building a hierarchy of a plurality of counters, each counter being associated with a node of said plurality of nodes of said tree structure, wherein a counter of said plurality of counters is indexed by said set of full path indicators; and
updating a value stored in said counter, said value indicating a count of one or more documents of said plurality of documents, said one or more documents categorized by a sub-category of a category or sub-category indicated by a constraint of said plurality of constraints.

5. The method of claim 3, wherein said scheme is a Dewey labeling scheme.

6. The method of claim 1, further comprising:
receiving, by said IR system, an arithmetic expression included in said query, said arithmetic expression associated with at least one numeric field included in one or more documents of said plurality of documents; and
computing an evaluation of said arithmetic expression, said computing performed per sub-category of a category indicated by a constraint of said plurality of constraints.

7. The method of claim 6, wherein said arithmetic expression includes at least one of an aggregate function and a basic formula,
wherein said aggregate function includes at least one of a sum, a product, a maxima, a minima, and an average, and
wherein said basic formula includes any combination of one or more numeric fields, one or more numeric constants, one or more arithmetic operators, and parentheses that indicate a parenthetical expression.

8. The method of claim 1, wherein said constructing said inverted index comprises:
designating, for each document of said plurality of documents, a set of one or more indexed tokens of said plurality of unique indexed tokens as a set of one or more exact tokens, each exact token indicating a final sub-category categorizing one or more documents of said plurality of documents, wherein each document categorized by said final sub-category is not categorized by a child sub-category of said final sub-category; and
identifying, via said query utilizing said set of one or more exact tokens, said document as residing in said final sub-category, but not in any child sub-category of said final sub-category.

9. A computer system comprising:
a central processing unit (CPU);
a memory coupled to said CPU;
a computer-readable, tangible storage device coupled to said CPU, said storage device containing instructions that are carried out by said CPU via said memory to implement a method of querying multifaceted information, said method comprising:
constructing an inverted index having a plurality of unique indexed tokens associated with a plurality of posting lists in a one-to-one correspondence, each posting list including one or more documents of a plurality of documents, wherein an indexed token of said plurality of unique indexed tokens is one of a facet token included as an annotation in a document of said plurality of documents and a path prefix of said facet token, wherein said annotation indicates a path within a tree structure representing a facet that includes said document, said tree structure including a plurality of nodes representing a category and one or more sub-categories that categorize said document;
receiving a query that includes a plurality of constraints on said plurality of documents, said plurality of constraints being associated with multiple indexed tokens of said plurality of unique indexed tokens and multiple posting lists corresponding to said multiple indexed tokens; and executing said query by
identifying said multiple posting lists via a utilization of said plurality of constraints and said inverted index, and
intersecting said multiple posting lists to obtain a result of said query.

10. The system of claim 9, wherein said plurality of constraints includes one or more facet constraints and one or more free-text constraints, and wherein said identifying said multiple posting lists comprises:
identifying, via said inverted index, a first set of one or more indexed tokens associated with said one or more facet constraints in a one-to-one correspondence and a second set of one or more indexed tokens associated with said one or more free-text constraints in a one-to-one correspondence, said first set and said second set of one or more indexed tokens included in said plurality of unique indexed tokens; and
identifying, via said inverted index, a first group of one or more posting lists and a second group of one or more posting lists, said one or more posting lists of said first group associated with said one or more indexed tokens of said first set in a one-to-one correspondence and said one or more posting lists of said second group associated with said one or more indexed tokens of said second set in a one-to-one correspondence.

11. The system of claim 9, wherein said constructing said inverted index comprises:
generating a full path token and a full path token posting list associated therewith by said inverted index, said full path token posting list including a plurality of identifiers representing said plurality of documents, wherein an identifier of said plurality of identifiers represents said document and includes a payload value, said payload value identifying a full path of said document in said tree structure, and said payload value including a set of full path indicators provided by a scheme that uniquely labels each sibling node of said tree structure.

12. The system of claim 11, further comprising:
building a hierarchy of a plurality of counters, each counter being associated with a node of said plurality of nodes of said tree structure, wherein a counter of said plurality of counters is indexed by said set of full path indicators; and
updating a value stored in said counter, said value indicating a count of one or more documents of said plurality of documents, said one or more documents categorized by a sub-category of a category or sub-category indicated by a constraint of said plurality of constraints.

13. The system of claim 11, wherein said scheme is a Dewey labeling scheme.

14. The system of claim 9, further comprising:
receiving, by said IR system, an arithmetic expression included in said query, said arithmetic expression associated with at least one numeric field included in one or more documents of said plurality of documents; and
computing an evaluation of said arithmetic expression, said computing performed per sub-category of a category indicated by a constraint of said plurality of constraints.

15. The system of claim 14, wherein said arithmetic expression includes at least one of an aggregate function and a basic formula,
wherein said aggregate function includes at least one of a sum, a product, a maxima, a minima, and an average, and wherein said basic formula includes any combination of one or more numeric fields, one or more numeric constants, one or more arithmetic operators, and one or more sets of parentheses that indicate parenthetical expressions.

16. The system of claim 9, wherein said constructing said inverted index comprises:
designating, for each document of said plurality of documents, a set of one or more indexed tokens of said plurality of unique indexed tokens as a set of one or more exact tokens, each exact token indicating a final sub-category categorizing one or more documents of said plurality of documents, wherein each document categorized by said final sub-category is not categorized by a child sub-category of said final sub-category; and
identifying, via said query utilizing said set of one or more exact tokens, said document as residing in said final sub-category, but not in any child sub-category of said final sub-category.

17. A computer program product comprising a computer-readable, tangible storage device having a computer-readable program code stored therein, said computer-readable program code containing instructions that are carried out by a processor of a computer system to implement a method of querying multifaceted information in an information retrieval system, said method comprising:
constructing, by said information retrieval (IR) system, an inverted index having a plurality of unique indexed tokens associated with a plurality of posting lists in a one-to-one correspondence, each posting list including one or more documents of a plurality of documents, wherein an indexed token of said plurality of unique indexed tokens is one of a facet token included as an annotation in a document of said plurality of documents and a path prefix of said facet token, wherein said annotation indicates a path within a tree structure representing a facet that includes said document, said tree structure including a plurality of nodes representing a category and one or more sub-categories that categorize said document;
receiving, by said IR system, a query that includes a plurality of constraints on said plurality of documents, said plurality of constraints being associated with multiple indexed tokens of said plurality of unique indexed tokens and multiple posting lists corresponding to said multiple indexed tokens; and
executing said query by said IR system by:
identifying said multiple posting lists via a utilization of said plurality of constraints and said inverted index, and
intersecting said multiple posting lists to obtain a result of said query.

18. The program product of claim 17, wherein said plurality of constraints includes one or more facet constraints and one or more free-text constraints, and wherein said identifying said multiple posting lists comprises:
identifying, via said inverted index, a first set of one or more indexed tokens associated with said one or more facet constraints in a one-to-one correspondence and a second set of one or more indexed tokens associated with said one or more free-text constraints in a one-to-one correspondence, said first set and said second set of one or more indexed tokens included in said plurality of unique indexed tokens; and
identifying, via said inverted index, a first group of one or more posting lists and a second group of one or more posting lists, said one or more posting lists of said first group associated with said one or more indexed tokens of said first set in a one-to-one correspondence and said one or more posting lists of said second group associated with said one or more indexed tokens of said second set in a one-to-one correspondence.

19. The program product of claim 17, wherein said constructing said inverted index comprises:
generating a full path token and a full path token posting list associated therewith by said inverted index, said full path token posting list including a plurality of identifiers representing said plurality of documents, wherein an identifier of said plurality of identifiers represents said document and includes a payload value, said payload value identifying a full path of said document in said tree structure, and said payload value including a set of full path indicators provided by a scheme that uniquely labels each sibling node of said tree structure.

20. The program product of claim 19, wherein said method further comprises:
building a hierarchy of a plurality of counters, each counter being associated with a node of said plurality of nodes of said tree structure, wherein a counter of said plurality of counters is indexed by said set of full path indicators; and
updating a value stored in said counter, said value indicating a count of one or more documents of said plurality of documents, said one or more documents categorized by a sub-category of a category or sub-category indicated by a constraint of said plurality of constraints.

* * * * *